US006859320B2

(12) United States Patent
Yeh et al.

(10) Patent No.: US 6,859,320 B2
(45) Date of Patent: Feb. 22, 2005

(54) DISPERSION COMPENSATION USING RESONANT CAVITIES

(75) Inventors: Pochi Albert Yeh, Thousand Oaks, CA (US); Scott Patrick Campbell, Thousand Oaks, CA (US); Zhiling Xu, Camarillo, CA (US)

(73) Assignee: Oplink Communications, Inc., San Jose, CA (US)

( * ) Notice: Subject to any disclaimer, the term of this patent is extended or adjusted under 35 U.S.C. 154(b) by 138 days.

(21) Appl. No.: 10/215,232

(22) Filed: Aug. 8, 2002

(65) Prior Publication Data

US 2003/0053214 A1 Mar. 20, 2003

Related U.S. Application Data

(60) Provisional application No. 60/311,537, filed on Aug. 9, 2001.

(51) Int. Cl.[7] ............................................... G02B 27/00

(52) U.S. Cl. ...................... 359/577; 359/584; 359/589; 359/590; 398/147; 356/454; 356/480

(58) Field of Search .............................. 398/147, 141; 359/580, 584, 586, 587, 588, 589, 590, 577; 356/480, 454, 471

(56) References Cited

U.S. PATENT DOCUMENTS

| 6,081,379 A | 6/2000 | Austin et al. | |
| 2001/0021053 A1 * | 9/2001 | Colbourne et al. | ......... 359/161 |

OTHER PUBLICATIONS

"Optical Equalization to Combat the Effects of Laser Chirp and Fiber Dispersion," by Leonard J. Cimini, Jr. et al; *Journal Of Lightwave Technology*, vol. 8, No. 5, May 1990, pp 649–659.

"Double Gires–Tournois interferometer negative–dispersion mirrors for use in tunable mode–locked lasers," by B. Golubovic et al.; *Optic Letters*, vol. 25, No. 4, Feb. 15, 2000, pp 275–277.

"Adjustable dispersion–slope compensator using entirely thin–film coupled–cavity allpass filters in a multi–reflection parallel configuration," by M. Jablonski et al; Mar. 2001 *Opt. Soc. America*, pp 1–3.

"General Optical All–Pass Filter Structures for Dispersion Control in WDM System," by G. Lenz et al.; *Journal Of Lightwave Technology*, vol. 17, No. 7, Jul. 1999, pp 1248–1254.

(List continued on next page.)

*Primary Examiner*—Fayez G. Assaf
(74) *Attorney, Agent, or Firm*—Scot A. Reader

(57) ABSTRACT

Multi-stage, all-pass optical filters used to make low-loss, multi-channel dispersion compensation modules are disclosed. The all-pass optical filters can be ring resonators in waveguides, Gires-Tournois Interferometers (GTIs) in free space form, and the like. The coupling constants and circulating path lengths may also be distinctively varied in each of the series of GTIs, tuning the net dispersion spectrum of the GTI set, such that the sum of the dispersions from the series of GTI's can provide a system with greater bandwidth than the same number of identical GTIs. The local dispersion slope can also be tuned in this manner. Multi-cavity GTIs can also be formed with similar performance enhancing properties.

26 Claims, 18 Drawing Sheets

OTHER PUBLICATIONS

"Optical All–Pass Filters for Phase Response Design with Applications for Dispersion Compensation," by C. K. Madsen et al.; *IEEE Photonics Technology Letters*, vol. 10, No. 7, Jul. 1998, pp994–996.

"Multistage dispersion compensator using ring resonators," by C. K. Madsen et al.; *Optics Letters*, vol. 24, No. 22, Nov. 15, 1999, pp 1555–1557.

"Integrated All–Pass Filters for Tunable Dispersion and Dispersion Slope Compensation," by C. K. Madsen et al.; *IEEE Photonics Technology Letters*, vol. 11, No. 12, Dec. 1999, pp 1623–1625.

"Compact Integrated Tunable Chromatic Dispersion Compensator with a 4000 ps/nm Tuning Range," by C. K. Madsen et al; 2000 *Optical Society of America*, pp 1–3.

"Optical all–pass filters for polarization mode dispersion compensation," by C. K. Madsen; 2000 *Optical Society of America*, pp 878–880.

"A Multi–channel Dispersion Slope Compensating Optical Allpass Filter," by C. K. Madsen et al.

"All–Fiber Devices for Chromatic Dispersion Compensation Based on Chirped Distributed Resonant Coupling," by Francois Ouellette et al.; *Journal Of Lightwave Technology*, vol. 12, No. 10, Oct. 1994, pp 1728–1738.

"Negative dispersion mirrors for dispersion control in femtosecond lasers: chirped dielectric mirrors and multi–cavity Gires–Tournois interferometers," by R. Szipöcs et al.; *Applied Physic B, Lasers and Optics*, B70 [Suppl.] (2000), pp S51–S57.

* cited by examiner

DISPERSION COMPENSATION USING RESONANT CAVITIES

CROSS-REFERENCE TO RELATED APPLICATION

Embodiments of the present invention claim priority from U.S. provisional patent application Ser. No. 60/311,537, entitled "Dispersion Compensation Using Resonant Cavities, And Bandwidth And Slope Improvements In Resonant Dispersion Filters," filed Aug. 9, 2001, the contents of which is incorporated herein by reference for all purposes.

BACKGROUND OF THE INVENTION

1. Field of the Invention

The present invention relates, generally, to dispersion compensation systems and methods and, in preferred embodiments, to dispersion compensation using resonant cavities, and bandwidth and slope improvements in resonant dispersion filters.

2. Description of Related Art

Optical fiber systems have the potential for achieving extremely high communication rates, such as in the OC-192 and OC-768 high data rate systems. At these extremely high data rates, the modulation bandwidth is so large that even for an ideal source without chirp or phase noise, fiber dispersion, and particularly chromatic dispersion, becomes a critical issue. Fiber dispersion broadens the optical pulse and causes pulse spreading due to increased spectral width over long propagation distances. Therefore, fiber dispersion limits the distance that high data rate optical signals can be transmitted through optical fibers. The higher the data rate, the shorter the distance that optical signal can be transmitted without the need for dispersion compensation. Dispersion compensators are thus critical components for high data rate optical network systems.

Several methods for chromatic dispersion compensation (CDC) have been previously documented. In C. K. Madsen, G. Lenz, A. J. Bruce, et. al., "Multistage dispersion compensator using ring resonators", Opt. Lett., vol. 24, no. 22, 1555 (1999), a demonstration was presented to compensate dispersion in periodic communication channels with two-stage ring resonators in planar waveguides. However, planar waveguides suffer from polarization-mode dependent dispersion and high sensitivity to temperature.

The group velocity dispersion (GVD) in optical fibers may be compensated by using a Gires-Tournois Interferometer (GTI). However, the useful depth of compensation in a single GTI is not adequate for long-distance, broadband applications. Furthermore, narrow bandwidth dispersions create problems in GTI-based resonant dispersion filters.

In C. K. Madsen and G. Lenz, "A multi-channel dispersion slope compensating optical allpass filter", L. J. Cimini, L. J. Greenstein and A. A. M. Saleh, "Optical equalization to combat the effects of laser chirp and fiber dispersion", J. Lightwave Tech., vol. 8, no. 5, 649 (1990), and F. Quellette, J.-F. Cliche, and S. Gagnon, "All-fiber devices for chromatic dispersion compensation based on chirped distributed resonant coupling", J. Lightwave Tech. Vol. 12, no. 10, 1728 (1994), the use of GTIs to compensate for the chromatic dispersion in wavelength division multiplexing (WDM) systems was proposed. However, due to the narrow effective wavelength range in their system's channels, this method is rarely used in actual CDC systems, and no further investigation was reported.

In C. K. Madsen and G. Lenz, "A multi-channel dispersion slope compensating optical allpass filter", a method of dispersion-slope compensation was mentioned by making the reflectivity of the lower reflection mirror in the GTI change with wavelength.

As a dispersion compensating device, a GTI is mainly used to obtain an ultra-short laser pulse, as was documented in R. Szipocs, A. Kohazi-Kis, S. Lako, et. al., "Negative dispersion mirrors for dispersion control in femtosecond lasers: chirped dielectric mirrors and multi-cavity Gires-Tournois interferometers", Appl. Phys. B, vol. 70 [suppl.], s51–s57 (2000), B. Golubovic, R. R. Austin, M. K. Steiner-Shepard, et al., "Double Gires-Tournois interferometer negative-dispersion mirrors for use in tunable mode-locked lasers", Opt. Lett., vol. 25, no. 4, 275 (2000), and R. R. Austin, B. Golubovic, "Multiple coupled Gires-Tournois interferometers for group-delay-dispersion control", U.S. Pat. No. 6,081,379. Within the operating wavelength range (e.g. 700 nm~900 nm) only one interval of the wavelength period structure appears. Therefore, the distance between the two reflecting mirrors is very short, about ½ of the center wavelength. In ultra-short laser pulse related research, in order to get the desired negative chromatic dispersion, a multi-cavity structure was proposed. Once again, though, these cavity lengths are on the order of a fraction of a wavelength.

The use of multiple reflections between two GTIs was adopted in an ultra-short laser pulse generating system in B. Golubovic, R. R. Austin, M. K. Steiner-Shepard et. al., "Double Gires-Tournois interferometer negative-dispersion mirrors for use in tunable mode-locked lasers", Opt. Lett., vol. 25, no. 4, 275 (2000). Once again, though, these cavity lengths are on the order of a fraction of a wavelength.

The use of multiple reflections between two GTIs was also adopted to compensate dispersion slope in M. Jablonski, Y. Tanaka, H. Yaguchi, et. al., "Adjustable dispersion-slope compensator using entirely thin film coupled-cavity allpass filters in a multi-reflection parallel configuration", OFC 2001. Because the working bandwidth is broad (about 3 nm), the GTIs used therein are thin film layers (about 10~20 micron). However, this device cannot be used to be CDC device because the amplitude of negative dispersion is too small (<10 ps/nm).

The use of off-axis-illuminated multiple-coupled-cavity etalons has been described in P. Colbourne, et al., in "Chromatic Dispersion Compensation Device," European Patent Application EP 1 098 211 A1, and/or for on-axis-illuminated multiple-coupled-cavity etalons in P. Colbourne, et al., in "Chromatic Dispersion Compensation Device," U.S. patent application Ser. No. 2001/0021053 A1.

SUMMARY OF THE DISCLOSURE

It is an advantage of embodiments of the present invention to provide a system and method for dispersion compensation using resonant cavities.

It is a further advantage of embodiments of the present invention to provide a system and method for dispersion compensation using resonant cavities wherein the sum of the dispersions in each of a series of GTIs provides greater system bandwidth and selectable local dispersion slopes.

It is a further advantage of embodiments of the present invention to provide a system and method for dispersion compensation using compact resonant cavities with minimal insertion loss.

It is a further advantage of embodiments of the present invention to provide a system and method for tunable dispersion compensation for broadband simultaneous compensation for fibers of various lengths and dispersions.

The above-described and other advantages are accomplished by using a series of GTIs or other interference-based dispersion filters to create a dispersion compensating device. The coupling constants and circulating path lengths may also be distinctively varied in each of the series of GTIs, tuning the net dispersion spectrum of the GTI set, such that the sum of the dispersions from the series of GTIs can provide a system with greater bandwidth than the same number of identical GTIs. The local dispersion slope can also be tuned in this manner. Multi-cavity GTIs can also be formed with similar performance enhancing properties.

DETAILED DESCRIPTION OF PREFERRED EMBODIMENTS

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

Multi-stage, all-pass optical filters can be used to make low-loss, multi-channel dispersion compensation modules. The all-pass optical filters can be ring resonators in waveguides, GTIs in free space form, and the like. The embodiments of the present invention discussed herein concentrate on free-space GTI-based all-pass dispersion filters for purposes of explanation and illustration, but it should be understood that all forms of GTI-based dispersion filters fall within the scope of the present invention. These dispersion filters include, but are not limited to, a loop of optical fiber, a loop of channel waveguide, a loop of dielectric waveguide, a ring resonator comprised of a prism with reflecting surfaces, and a ring resonator comprised of three or more mirrors.

Figure 1:
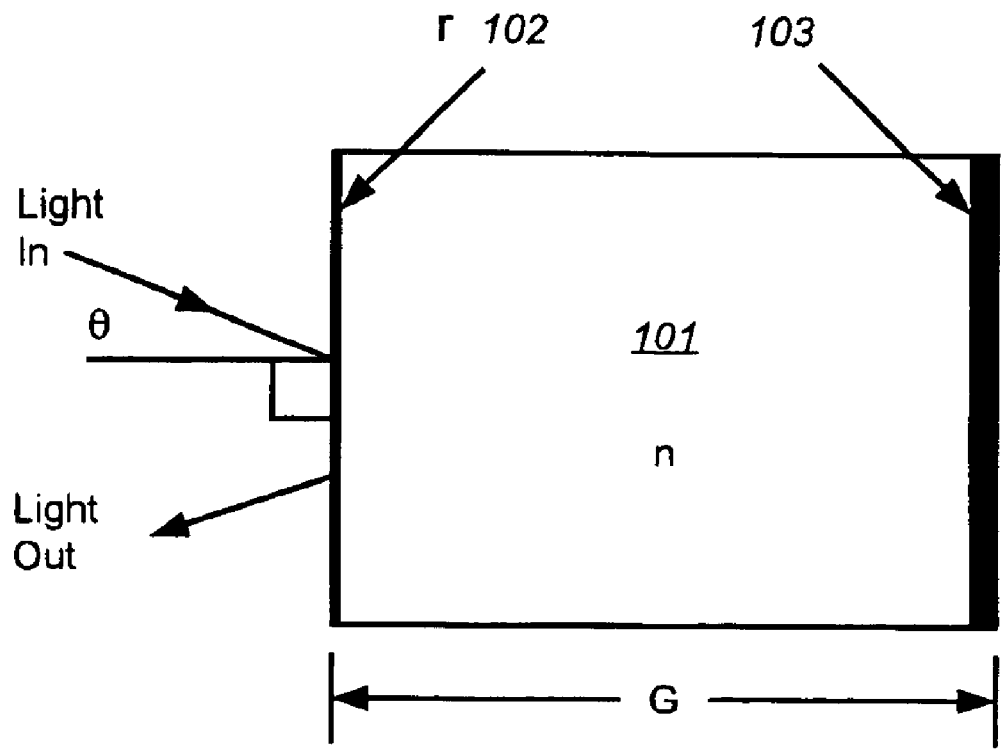
FIG. 1 is a block diagram illustrating the geometry of a typical free-space GTI.

FIG. 1 diagrams a typical free-space GTI geometry. In FIG. 1, there exists a cavity 101 of length G and refractive index n, a front mirror 102 with amplitude reflectivity r (as seen from within the GTI), and a back mirror 103 with approximately 100% reflectivity. The light beam interacting with this GTI enters from the GTI's front face at an external angle of incidence θ.

The group delay time, τ(λ), for one GTI can be written as $$\tau(\lambda) = \frac{2nG\cos\theta}{c} \cdot \frac{1-r^2}{1+r^2+2r\cos\left(\frac{4\pi nG\cos\theta}{\lambda}\right)}, \quad (1)$$

where n is the GTI cavity's refractive index, G is the GTI cavity's length, r is the (amplitude) reflectivity of the GTI's front-mirror (as seen from outside the GTI), θ is the external light incidence angle, c is the speed of light in vacuum, and $\lambda$ is the wavelength. The dispersion of the GTI (generally expressed in units of pico-seconds per nanometer, ps/nm) can thus be given by $$D(\lambda) = d\tau(\lambda)/d\lambda. \quad (2)$$

For N cascaded GTIs, the total dispersion can then be given by $$D(\lambda) = \sum_{j=1}^{N} D_j(\lambda) = \sum_{j=1}^{N} \frac{d}{d\lambda} \tau_j(\lambda) \quad (3)$$

$$= \sum_{j=1}^{N} \frac{d}{d\lambda} \left[ \frac{2n_{jk} G_j \cos\theta_j}{c} \cdot \frac{1 - r_j^2}{1 + r_j^2 + 2r_j \cos\left(\frac{4\pi n_{jk} G_j \cos\theta_j}{\lambda_k}\right)} \right]$$

where j stands for the $j^{th}$ GTI and k stands for the $k^{th}$ wavelength (the GTI cavity's refractive index n is linked to $\lambda$ through the subscript k). From Equations (1)–(3), it is evident that by changing any one or any combination of the different parameters n, G, θ, r, different dispersion features can be obtained, thereby tailoring and/or improving the performance of the dispersion filter set.

Figure 2A:
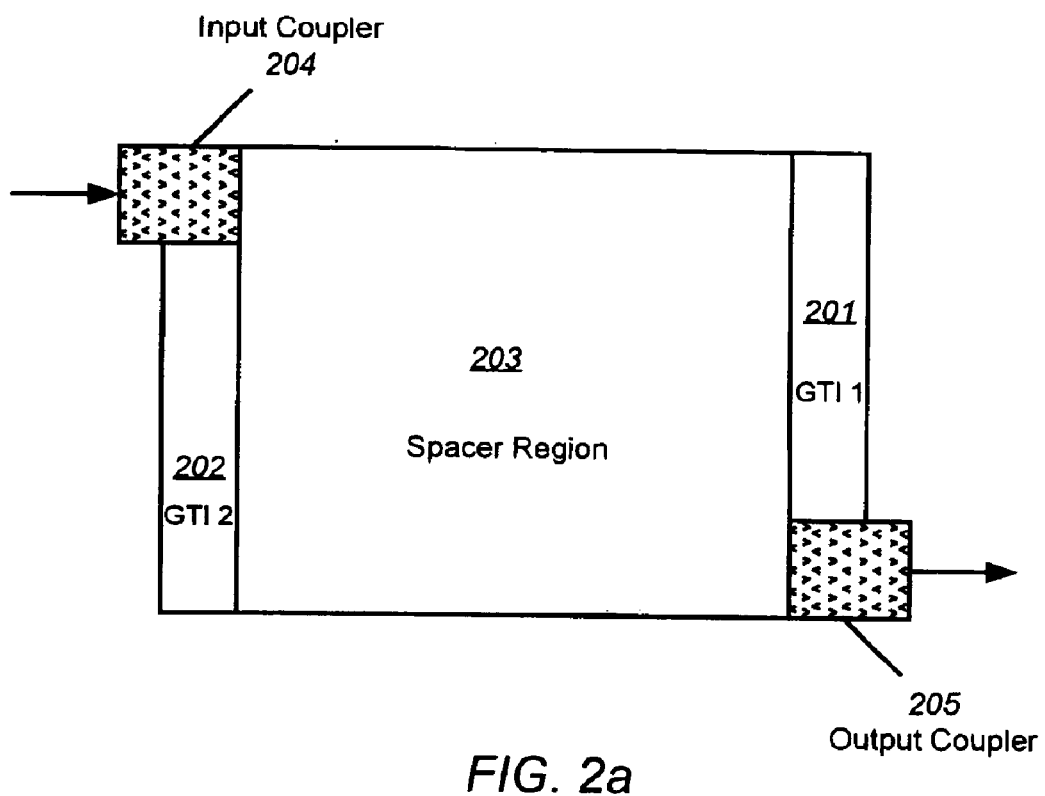
FIG. 2a is a block diagram illustrating a symmetric, dual-cavity, multiple pass GTI dispersion compensation module (DCM) according to an embodiment of the present invention.
Figure 2B:
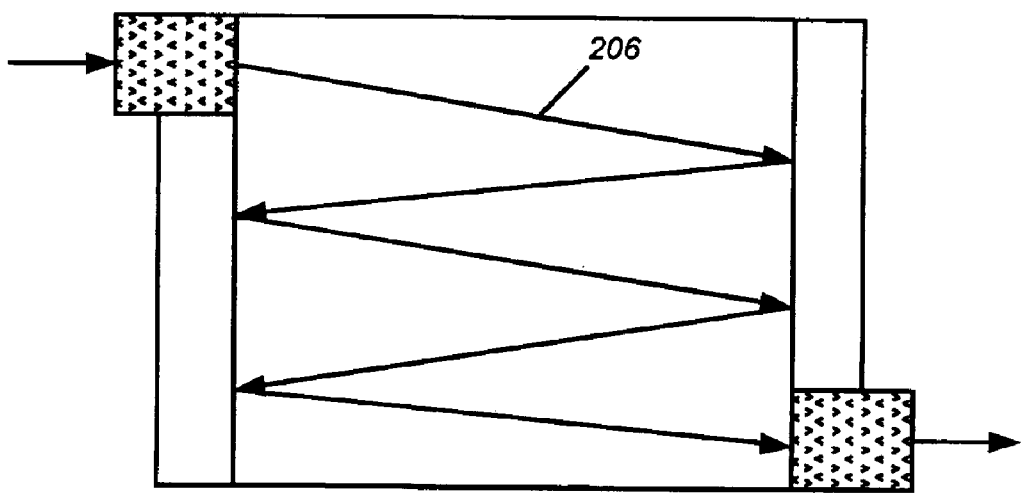
FIG. 2b is a block diagram illustrating a beam passing through the symmetric, dual-cavity, multiple pass GTI DCM of FIG. 2a according to an embodiment of the present invention.
Figure 3A:
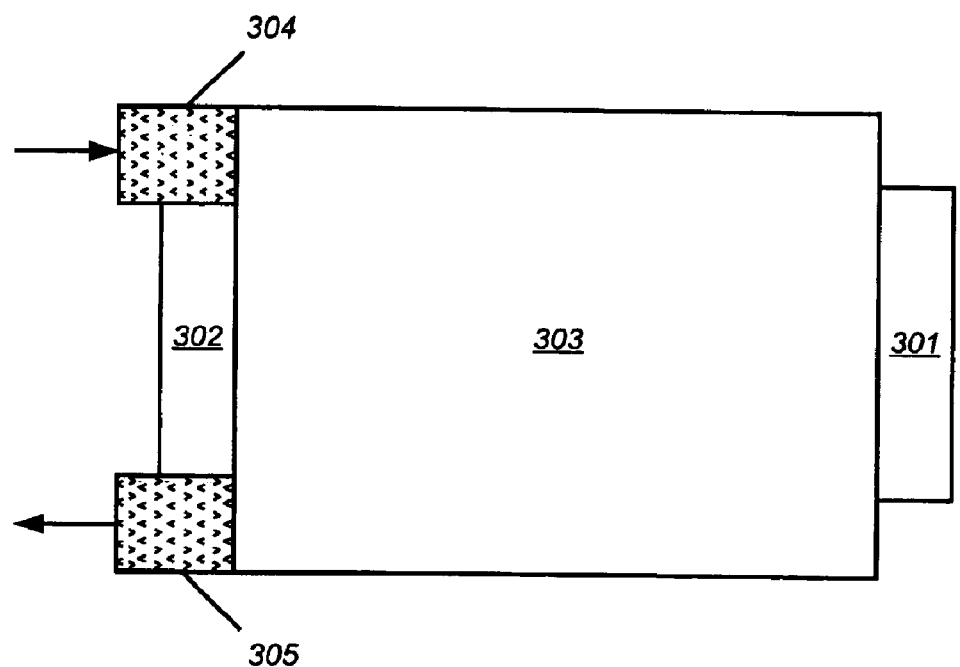
FIG. 3a is a block diagram illustrating an asymmetric, dual-cavity, multiple-pass GTI DCM according to an embodiment of the present invention.
Figure 3B:
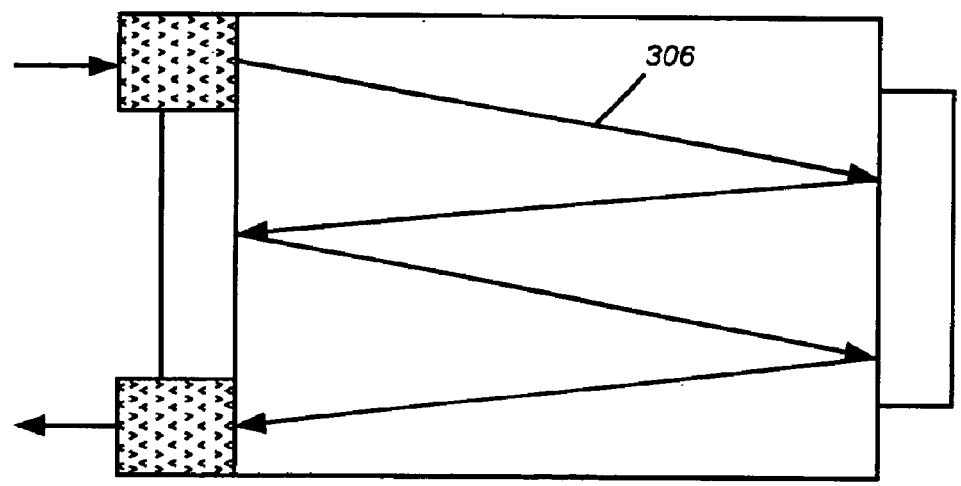
FIG. 3b is a block diagram illustrating a beam passing through the asymmetric, dual-cavity, multiple-pass GTI DCM of FIG. 3a according to an embodiment of the present invention.
Figure 4A:
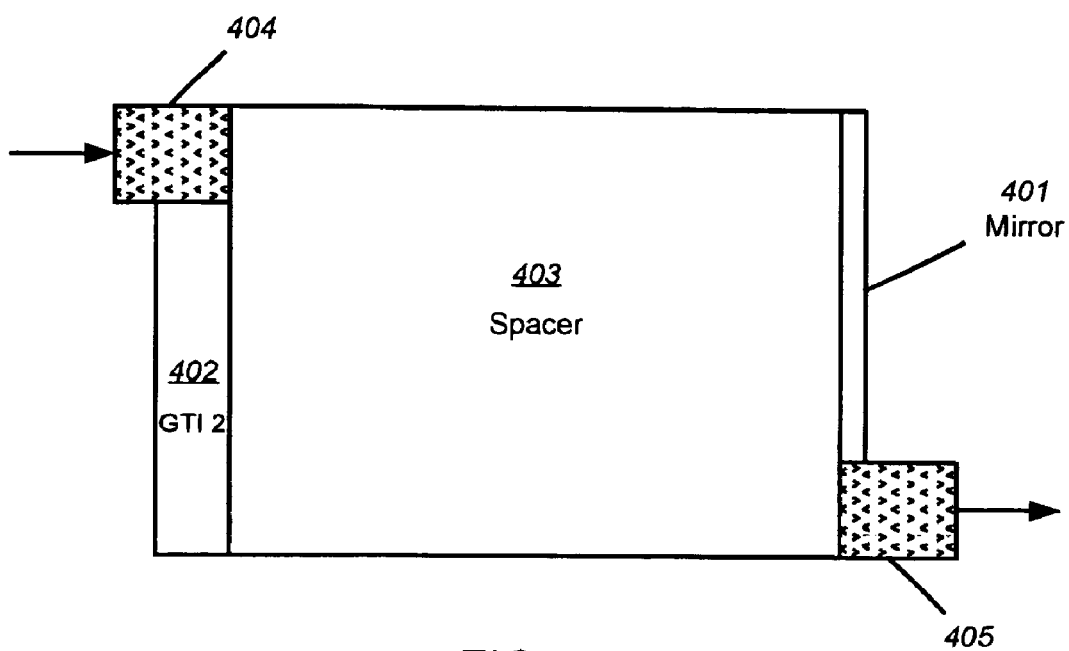
FIG. 4a is a block diagram illustrating a symmetric, single-cavity, multiple-pass GTI DCM according to an embodiment of the present invention.
Figure 4B:
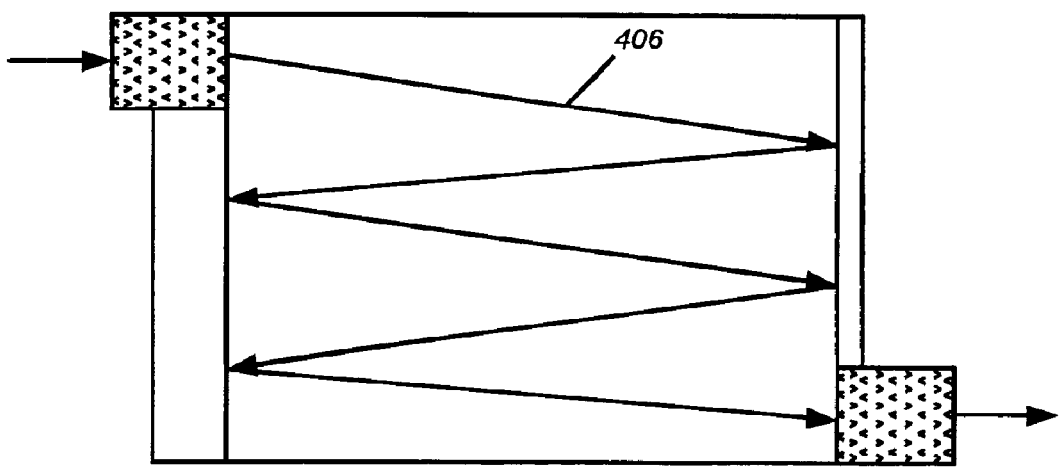
FIG. 4b is a block diagram illustrating a beam passing through the symmetric, single-cavity, multiple-pass GTI DCM of FIG. 4a according to an embodiment of the present invention.
Figure 5A:
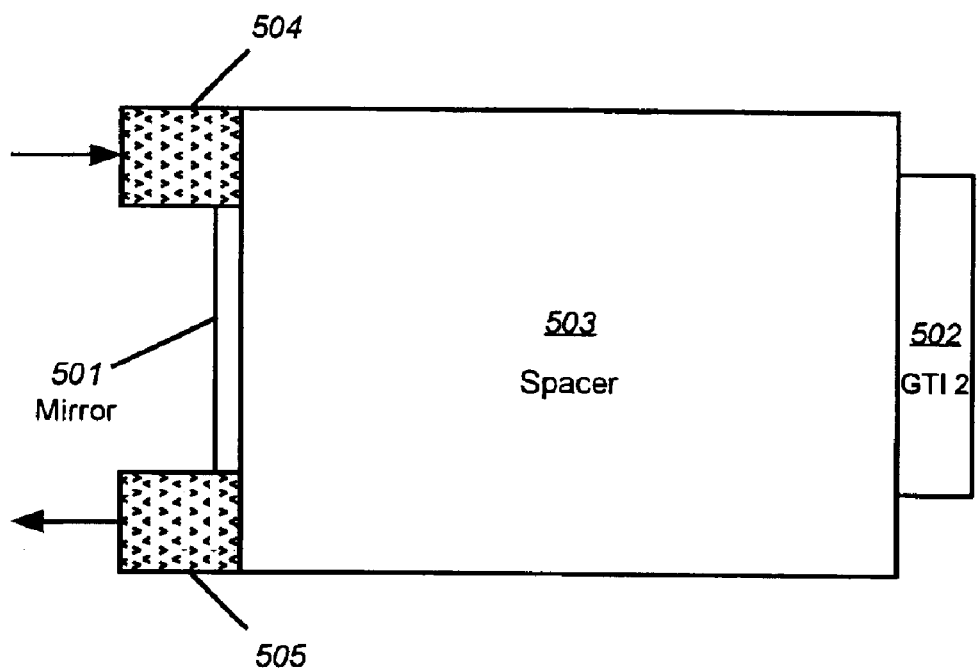
FIG. 5a is a block diagram illustrating an asymmetric, single-cavity, multiple-pass GTI DCM according to an embodiment of the present invention.
Figure 5B:
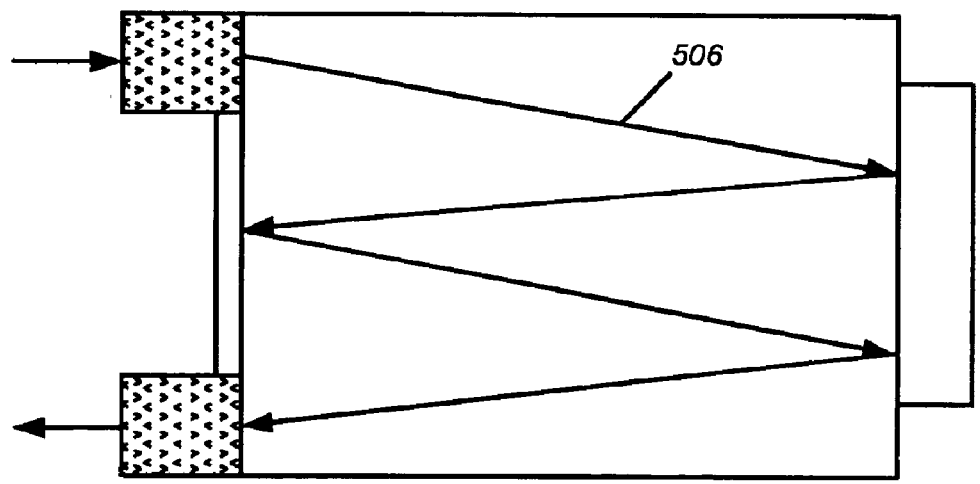
FIG. 5b is a block diagram illustrating a beam passing through the asymmetric, single-cavity, multiple-pass GTI DCM of FIG. 5a according to an embodiment of the present invention.
Figure 6A:
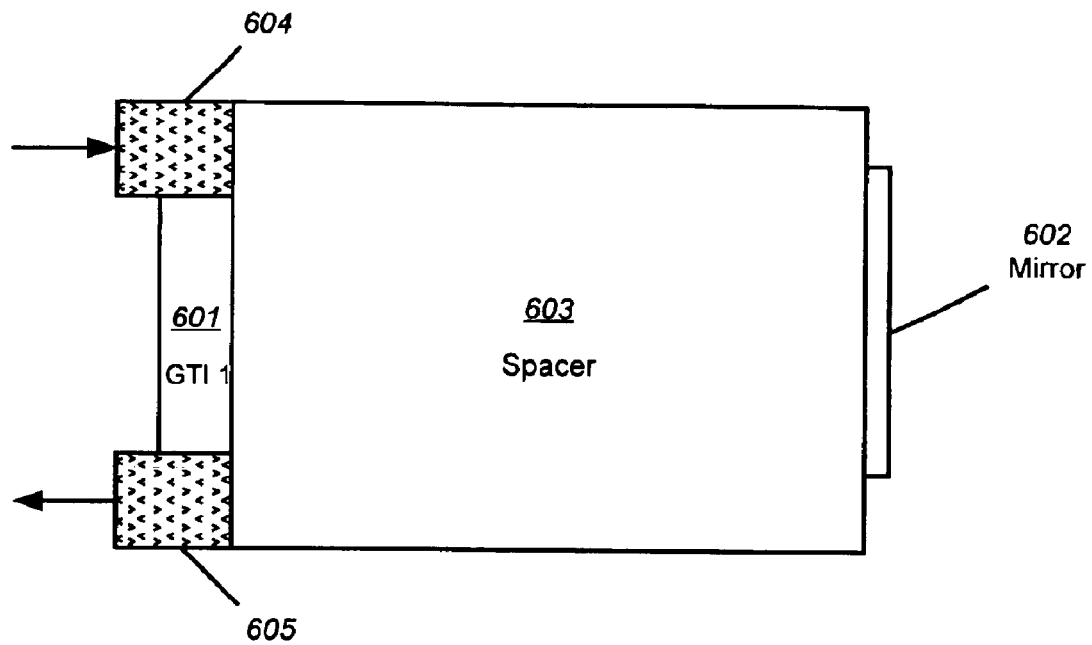
FIG. 6a is a block diagram illustrating a reverse asymmetric, single-cavity, multiple-pass GTI DCM according to an embodiment of the present invention.
Figure 6B:
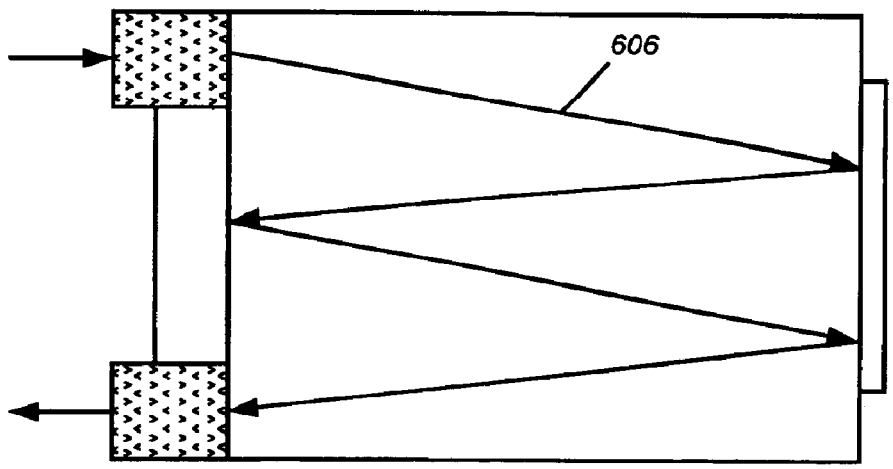
FIG. 6b is a block diagram illustrating a beam passing through the reverse asymmetric, single-cavity, multiple-pass GTI DCM of FIG. 6a according to an embodiment of the present invention.

For purposes of illustration and explanation of embodiments of the present invention, a specific form of dispersion filter will be discussed, that of a GTI-based optical system designed for use in fiber optic-based telecommunications systems. To expand on the use of a single GTI for dispersion compensation, consider the geometry diagrammed in FIG. 2 of a symmetric, dual-cavity, multiple pass GTI DCM. In FIG. 2a, there exists two reflective elements GTI1 201 and GTI2 202, a spacer region 203, an input coupler 204, and an output coupler 205. The GTIs and input and output couplers are typically affixed or located adjacent to opposite sides of the spacer region, which may be comprised of a solid or a gas gap. In FIG. 2b, this device has a beam 206 passing through it that makes N=4 interactions with the GTIs. Similarly, consider the geometry diagrammed in FIG. 3 of an asymmetric, dual-cavity, multiple pass GTI DCM. In FIG. 3a, there exists GTI1 301, GTI2 302, a spacer region 303, an input coupler 304, and an output coupler 305. In FIG. 3b, this device has a beam 306 passing through it that makes N=3 interactions with the GTIs. Similarly, consider the geometry diagrammed in FIG. 4 of a symmetric, single-cavity, multiple pass GTI DCM. In FIG. 4a, the two reflective elements include a standard mirror 401 and a GTI2 402, a spacer region 403, an input coupler 404, and an output coupler 405. In FIG. 4b, this device has a beam 406 passing through it that makes N=2 interactions with the GTI. Similarly, consider the geometry diagrammed in FIG. 5 of an asymmetric, single-cavity, multiple pass GTI DCM. In FIG. 5a, there exists a standard mirror 501, GTI2 502, a spacer region 503, an input coupler 504, and an output coupler 505. In FIG. 5b, this device has a beam 506 passing through it that makes N=2 interactions with the GTIs. Similarly, consider the geometry diagrammed in FIG. 6 of a reverse asymmetric, single-cavity, multiple pass GTI DCM. In FIG. 6a, there exists GTI1 601, a standard mirror 602, a spacer region 603, an input coupler 604, and an output coupler 605. In FIG. 6b, this device has a beam 606 passing through it that makes N=1 interactions with the GTI. Multiple types of sequential GTIs can also be used. For example, if element 601 in FIG. 6 is replaced by several GTIs aligned side-by-side, and the overall geometry in FIG. 6 allows for N=X, where X is the number of GTIs that are side-by-side in FIG. 6, then additional dispersion functionality (i.e., wider passband, lower ripple, etc.) can be added to the DCM of FIG. 6.

Figure 7:
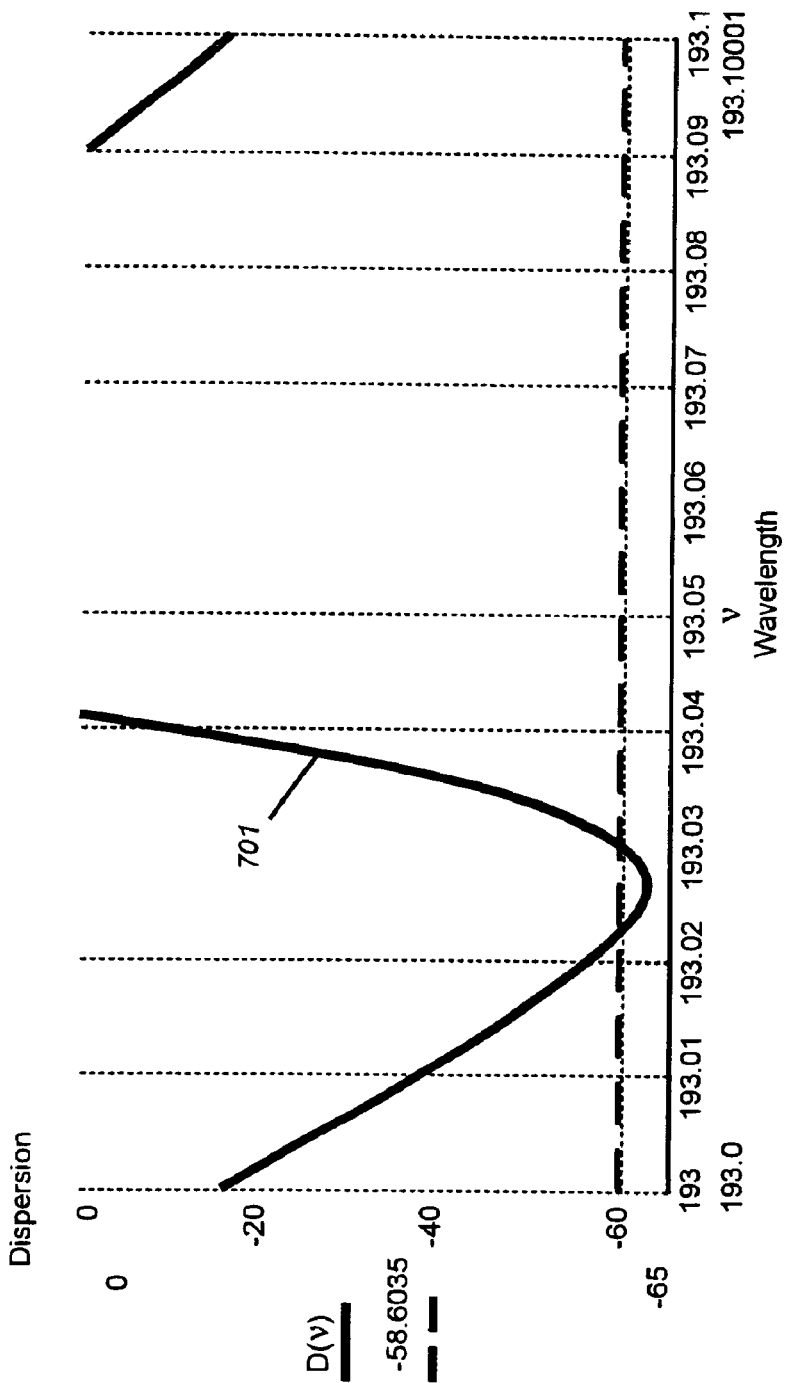
FIG. 7 is a plot of dispersion versus frequency in a symmetric, dual-cavity DCM wherein two discrete GTIs are used in the folded geometry of FIG. 2a according to an embodiment of the present invention.

As an example of the technique discussed herein with respect to an embodiment of the present invention, a DCM comprised of two GTIs with parameters ($n_{1k}$, $G_1$, $\theta_1$, $r_1$) and ($n_{2k}$, $G_2$, $\theta_2$, $r_2$), respectively, will be modeled (multiple types of GTIs could also be used). These GTIs will form a portion of a symmetric, dual-cavity DCM as diagrammed in FIG. 2. For both GTI's, n (the refractive index) can be modeled by the Sellmeier equation or other dispersion relation equation(s), well understood by those skilled in the art. Equation (3) can then be numerically calculated, the results from which can be plotted for interpretation. FIG. 7 contains one such plot from Equation (3) for the case of N=6 (two discrete GTIs are used in the folded geometry of FIG. 2). The dispersion is indicated at 701, wherein the negative part of the dispersion curve in a typical 100 GHz telecommunication channel is shown. The x-axis is optical frequency in terahertz (THz). . The dashed line is a desired level of dispersion for this example and it aids in showing the acceptable passband for the channel compensated. Note that in FIG. 7 the curve is cut off because only the negative dispersion part of it matters in this description.

Figure 8:
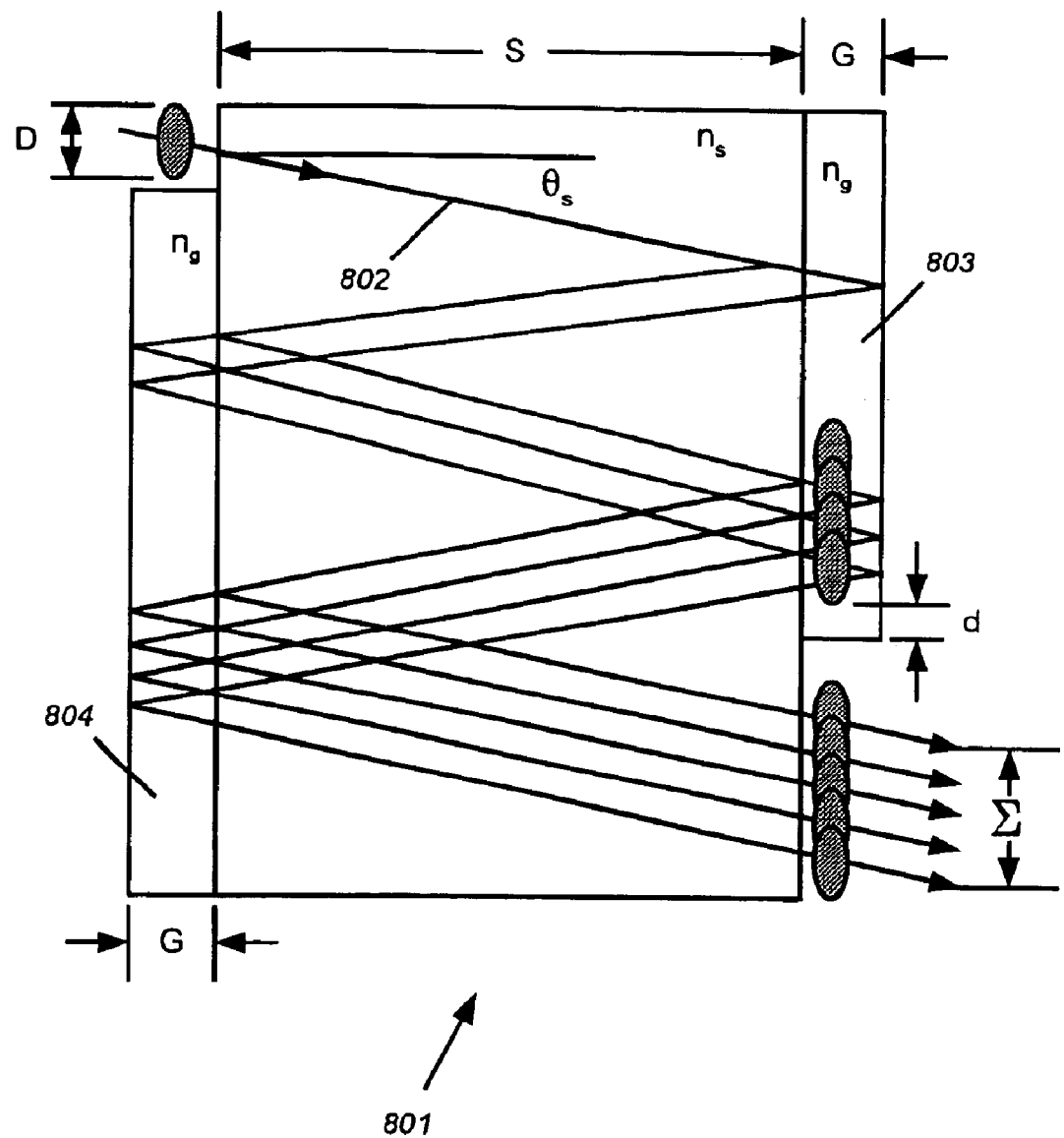
FIG. 8 is a block diagram illustrating the beam shift through a symmetric, dual-cavity DCM according to an embodiment of the present invention.

FIG. 8 illustrates that during propagation through a DCM 801, a beam 802 will experience a shifting, Σ, when the angle of incidence, θ, is not zero degrees. This is due to the multiple bounces, B, the beam will experience as it interacts with each GTI 803 and 804, and the multiple interactions, N, the beam will have with GTIs. Note that for each interaction the beam has with the GTI, the beam will experience B bounces. Bounces occur while the light is trapped within an etalon, whereas interactions indicate how many times light interacts with (enters, bounces around inside of, and then exits) the etalons. For example, the light might bounce around inside an etalon three times during a given interaction, so the number of bounces is three, while it may interact with the etalons six times, so the number of interactions is six. The beam should propagate through the DCM at a non-zero angle of incidence, if circulators are to be avoided, so as to allow the whole beam to enter and then exit the DCM system. The total shift resulting from N interactions with GTIs and B bounces within each GTI per interaction is then given as $$\sum = \frac{(D+d)BNGn_s}{Sn_g - 2BGn_s}, \quad (4)$$

where D is the beam diameter that contains a satisfactory amount of the beam's energy, d is an added displacement to compensate for raggedness at the edges of the GTI, B is the number of bounces a beam makes within each GTI interaction, N is the number of GTI interactions, G is the physical thickness of the GTI, $n_s$ is the refractive index of the spacer region, S is the length of the spacer region, and $n_g$ is the refractive index of the GTI region. This beam shift is diagrammed in FIG. 8 for the case of B=1 and N=4. Due to the beam shift, the final beam size becomes larger in the beam's axis that is parallel to the plane of incidence, and thus the pitch between two adjacent beams (as they interact with an etalon) needs to be larger in order for them to be separated.

The beam shift can then be added to the output beam diameter to determine the required beam pitch, P, the beam must have. The pitch is the spatial separation (in a single etalon) between the centers of the beams during two successive same-etalon interactions. From the pitch P and the spacer length, the propagation angle in the spacer region, $\theta_s$, can be determined as $$\theta_s = \frac{D+d+\sigma}{2S} \quad (5)$$

where $\sigma$ is the relative beam shift per bounce between two adjacent beams, and $P=D+d+\sigma$. This angle can then be entered into Equation (1) to obtain a practical device result.

Care must also be taken in the design of the DCM system, according to embodiments of the present invention, to consider beam divergence. That is, as a beam propagates through the DCM system, it will not be a perfect plane wave. The beam will change in size as it propagates, and the ray angles in the beam will be non-zero, further complicating the angle of incidence into the GTI. For example, for a Gaussian beam it can be shown that $$\omega(z) = \omega_o \left(1 + \left[\frac{z\lambda}{n\pi\omega_o^2}\right]^2\right)^{1/2} \quad (6)$$

where $\omega(z)$ is the $1/e^2$ power radius of the Gaussian beam at a distance z from the beam's waist, $\omega_0$ is the $1/e^2$ power radius of the Gaussian beam at the beam's waist (z=0), $\lambda$ is the beam's wavelength, n is the refractive index of the medium the beam is propagating in, and $\pi$ is pi. Furthermore, the radius of curvature for a Gaussian beam is given as $$R_c = z\left(1 + \left[\frac{n\pi\omega_o^2}{z\lambda}\right]^2\right) \quad (7)$$

where $R_c$ is the beam's radius of curvature.

Figure 9:
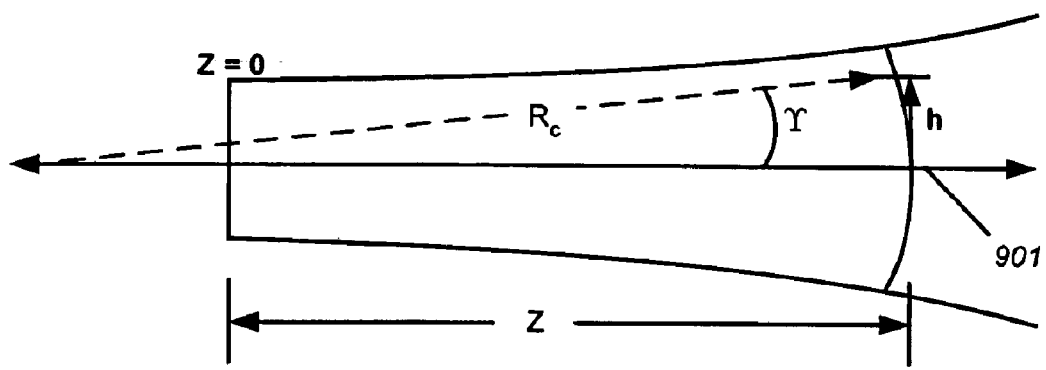
FIG. 9 is a diagram illustrating the radius of curvature of a Gaussian beam.

FIG. 9 diagrams the parameters of Equations (6) and (7), indicating also a general radius, h, from the optical axis 901 at a given propagation distance z. From Equation (7) the beam's radius of curvature can be calculated, and the ray angle within the beam, $\gamma$, can be calculated as $$\gamma = \frac{h}{R_c} \quad (8)$$

Figure 10:
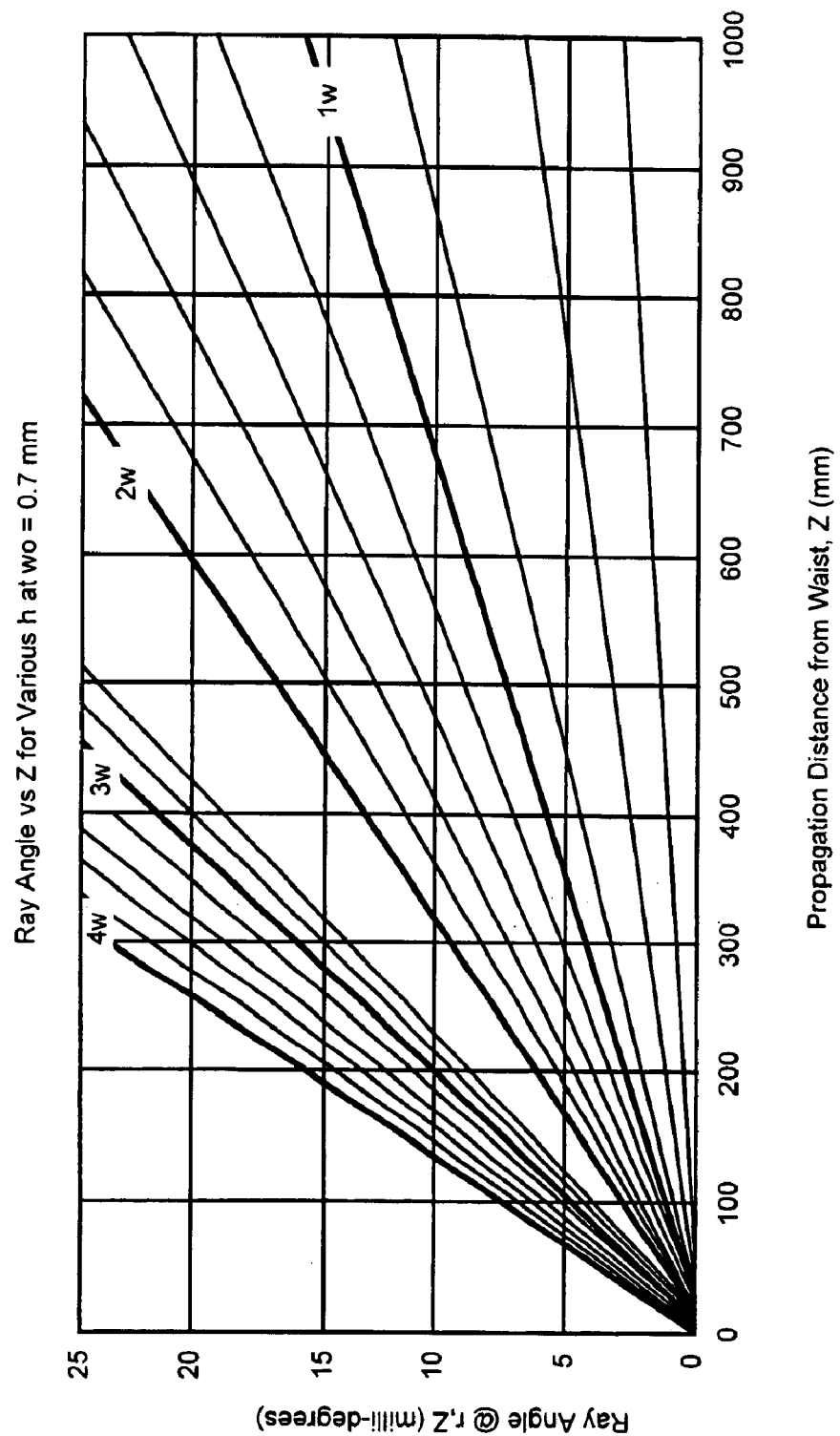
FIG. 10 is a plot of Gaussian beam ray angle versus propagation distance from waist.

Thus, the maximum ray angle in the Gaussian beam can be known for a given set of beam parameters. Equation (8) is plotted in FIG. 10 for the case of the Gaussian beam waist radius of $\omega_0=0.7$ mm for various values of h and z. The specific h to choose for calculating $\gamma$ would be one that encompasses a sufficient amount of the beam's energy (as mentioned above for D). For example, it can be shown that at $h=2\omega(z)$, more than 99.6% of the beam's energy is contained. Thus, within this degree of containment the beam's ray angles will stay within $+/-\gamma$. The spread in the angle of incidence to the GTI, as used in Equation (1), then becomes $$\theta \rightarrow \theta_0 \pm \gamma \quad (9)$$

Figure 11:
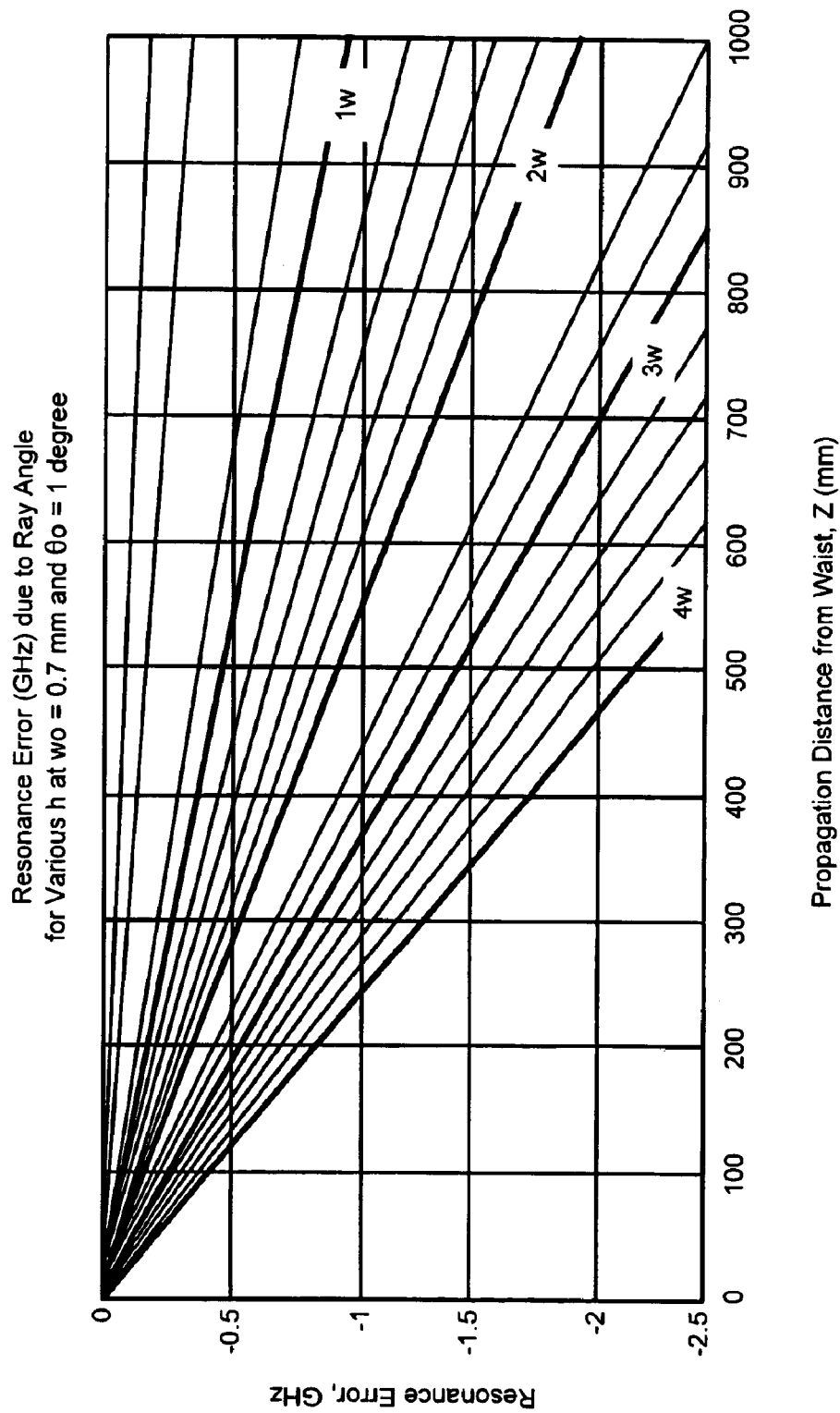
FIG. 11 is a plot of resonance error due to ray angle versus propagation distance from waist for various radii from the optical axis.
Figure 12:
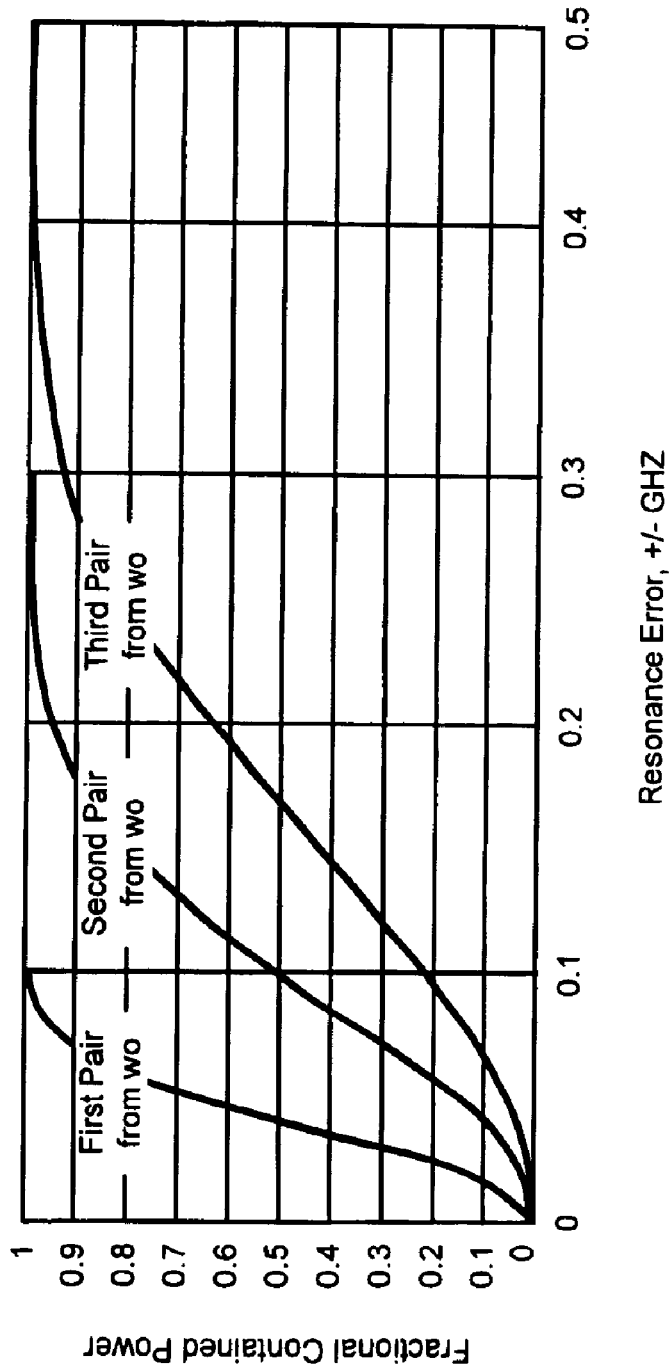
FIG. 12 is a plot of fractional contained power versus resonance error.

Due to this beam angle spread, there will be an error in the resonant frequency of a GTI compared to the ideal design resonant frequency when $\gamma=0$. FIG. 11 demonstrates a plot of such a resonance error for various h at $\omega_0=0.7$ mm and $\theta_0=1$ degree. Because the ray angle increases as h increases for some z, and because the ray angle also increases as z increases for some h, the amount of resonance error will increase as either h or z increase. Eventually, at some propagation distance and some beam radius, the resonance error will be too great for the DCM system to operate within specifications. How much resonance error is tolerable will depend on the DCM application. For example, for the case of FIG. 2 when B=3 and N=6 for $\omega_0=0.7$ mm and $\theta_0=1$ degree, the fractional amount of beam power contained within a given resonance error at various GTI interaction planes when $\omega_0$ is centered in the DCM propagation path is plotted in FIG. 12. From FIG. 12 it can be seen that, for this DCM system, less than 0.5 GHz of resonance error will occur for an ideal Gaussian beam of the parameters specified.

Figure 13:
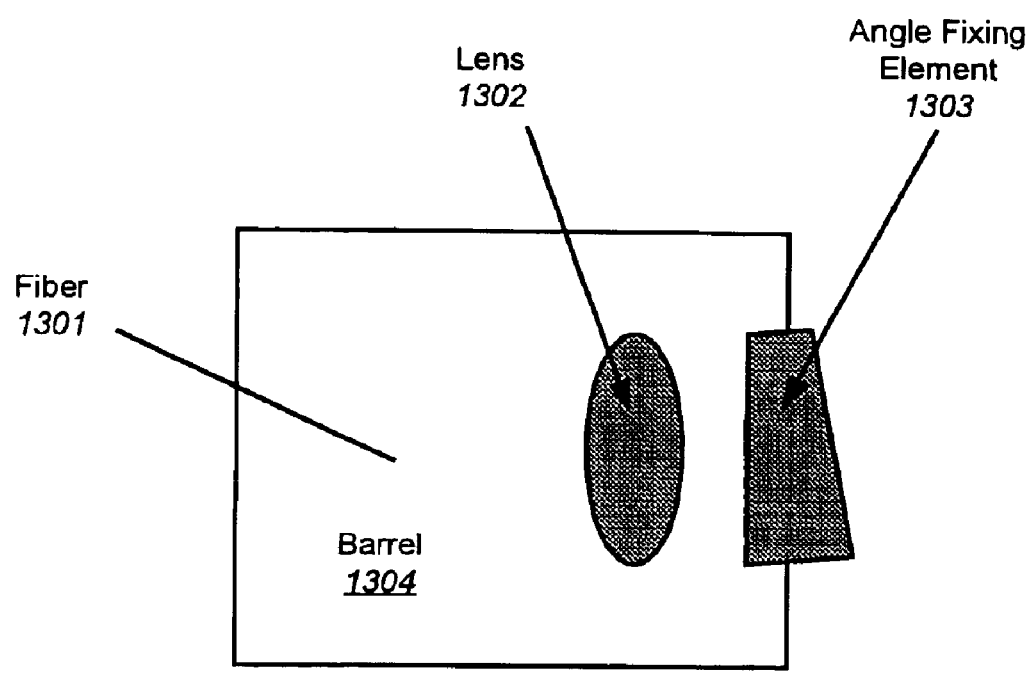
FIG. 13 is a block diagram of a coupler with a preset angle of incidence wedge according to an embodiment of the present invention.

Because of the above-discussed critical ray angle restrictions, in embodiments of the present invention a diffraction-limited beam coupler is employed at the input of the DCM system. Standard diffraction-limited collimating lens systems may be used in this GTI-based DCM approach. In addition to concerns regarding aberrations, which worsen the beam's phase-front quality, thereby causing it to spread out more rapidly, and will in turn cause loss in the system, the numerical aperture of the input and output couplers and the fiber should be matched. For the I/O couplers, this will require lenses of different focal lengths due to the beam spread and divergence discussed above. Finally, in one embodiment of the present invention, the final element of this lens design can be wedged such that by abutting this element to the spacer, the beam angle into the spacer region is discretely determined. Such an approach aids in manufacturability, and is diagrammed in FIG. 13. In FIG. 13, there exists an input or output fiber 1301, at least one lensing element 1302, an angle-fixing transparent element in the optical path 1303, and a barrel to house said components 1304. In alternative embodiments, components 1302 and 1303 may be a single element.

As noted above in the discussion of N cascaded GTIs, the coupling constants and/or resonant path lengths in each of a series of GTIs may be distinctively varied for tuning the net dispersion spectrum of the GTI set, allowing for greater system bandwidth and selectable local dispersion slopes. Multi-cavity GTIs may also be formed with similar performance enhancing properties. As an example of the technique discussed herein according to an embodiment of the present invention, a DCM consisting of two GTIs (N=2) with parameters $(n_{1k}, G_1, \theta_1, r_1)$ and $(n_{2k}, G_2, \theta_2, r_2)$, respectively, will be modeled. For both GTIs, $\theta_1=\theta_2=1°$, and n will be the refractive index for silica glass such that $$n_k(\lambda_k) = \sqrt{1 + \frac{0.6961663\lambda_k^2}{\lambda_k^2 - 0.0684043^2} + \frac{0.4079426\lambda_k^2}{\lambda_k^2 - 0.1162414^2} + \frac{0.897479\lambda_k^2}{\lambda_k^2 - 9.896161^2}} \quad (10)$$

Figure 14:
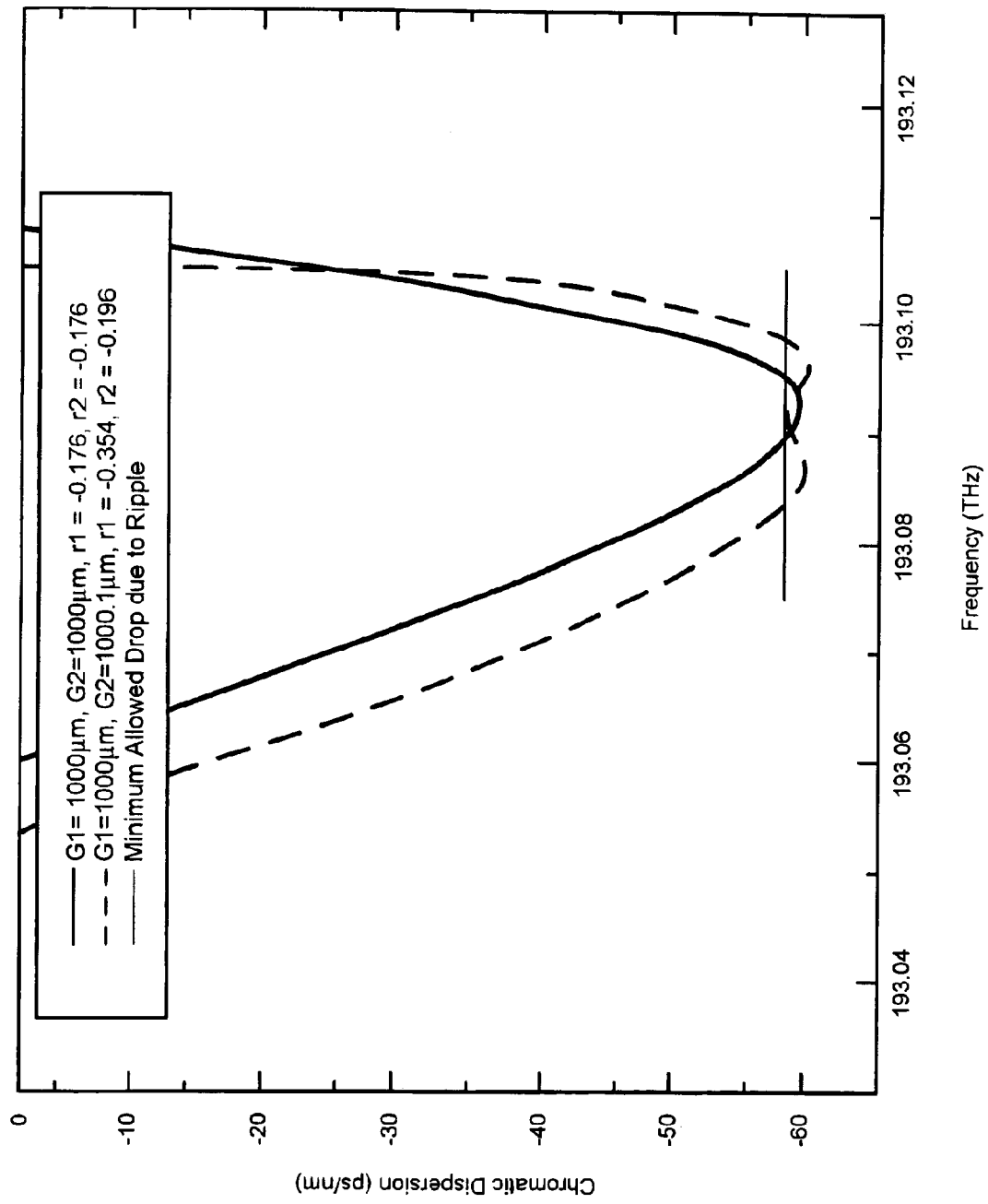
FIG. 14 is a plot of total chromatic dispersion versus frequency for two discrete GTIs used in tandem according to an embodiment of the present invention.

Equation (3) can then be numerically calculated and the results from which can be plotted for interpretation. FIG. 14 contains two such plots from Equation (3) for the case of N=2 (two discrete GTIs are used in tandem, as shown in FIG. 2). In the solid lines of FIG. 14, $G_1=G_2=1000$ microns and $r_1=r_2=-0.176$ such that the two GTIs are identical. As can be observed from the plot in FIG. 14, this DCM has a narrow working bandwidth. For example, the working bandwidth can be defined as the bandwidth within 0.2 dB of the largest dispersion magnitude (95.5%~100%). For the parameters of FIG. 14, this corresponds to a working bandwidth of approximately 7.5 GHz. However, using different parameters in the two combined GTIs (the invention disclosed herein), the working bandwidth may be broadened. Such an approach is diagrammed in the dashed line of FIG. 14 for which $G_1=1000$ microns, $G_2=1000.1$ microns, $r_1=-0.354$, and $r_2=-0.196$. The combined working bandwidth in this case is approximately 21 GHz. Thus by changing the parameters of the two combined GTIs, the combined working bandwidth has been notably improved.

Figure 15:
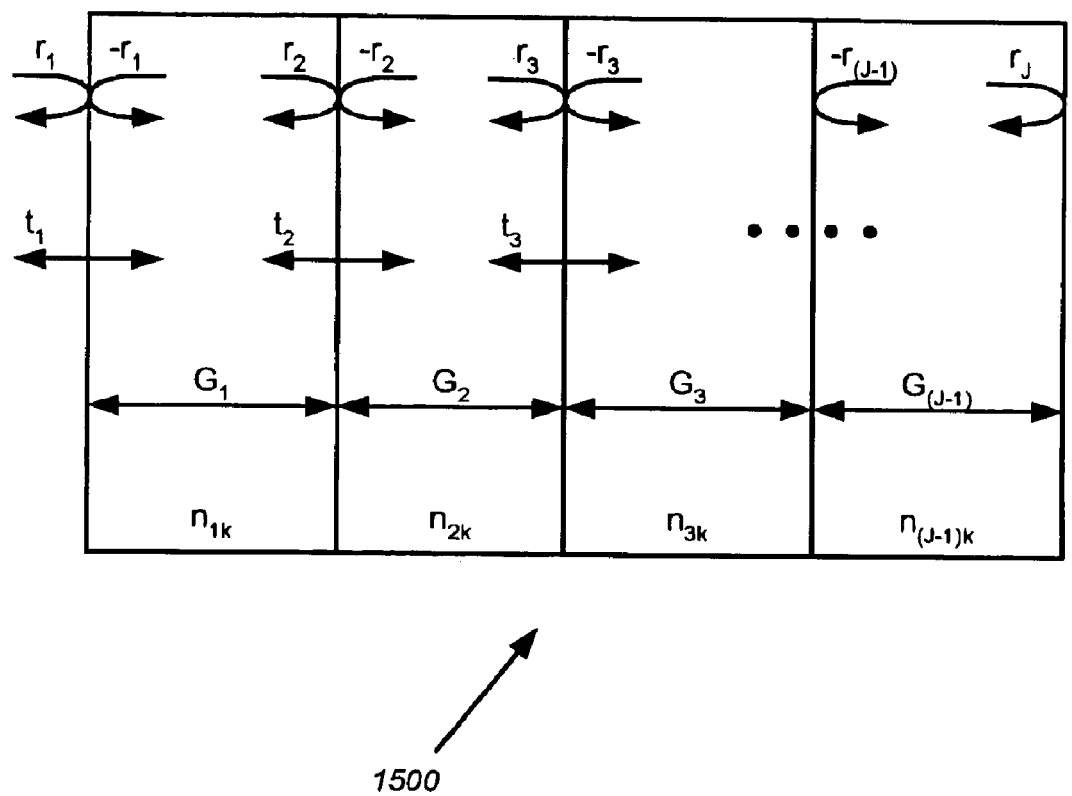
FIG. 15 is a diagram of the parameters in a multi-cavity GTI according to an embodiment of the present invention.

The concepts described above were related to the use of discrete GTIs in tandem. However, another form of GTI illustrated in FIG. 15 can be constructed according to embodiments of the present invention that contains multiple reflection planes and transmission paths. This new (coupled) multi-cavity GTI, or MGTI 1500, can be designed to provide shaping to the dispersion curve as did the above-described discrete combined GTI pairs. While MGTIs have been disclosed in the past, these approaches were for transmission paths on the order of a fraction of a wavelength to a few wavelengths, and they were mainly used in the compensation of dispersion of ultrashort laser pulse with a much wider passband than that in telecommunication applications. The concepts described herein pertain to transmission paths of arbitrary lengths, thereby allowing for much greater flexibilities in the designs and resulting performances. The mathematics that describe the properties of an MGTI are similar to those describing multi-cavity laser diode cavities, such as those described in L. A. Coldren and S. W. Corzine, "Diode Lasers and Photonic Integrated Circuits," Wiley Interscience, John Wiley and Sons, Inc., New York, 1995, the contents of which are incorporated by reference herein. The referenced Transmission and Scattering Matrix theories can then be applied to MGTIs to obtain an understanding of their behavior. For application to a general case of multiple reflection interfaces and propagation lengths, as would be found in an MGTI, the equations in "Diode Lasers and Photonic Integrated Circuits" can be extended to $$\begin{bmatrix} A_1 \\ B_1 \end{bmatrix} = \left( \prod_{j=1}^{m} [T_{r,j}][T_{p,j}] \right) [T_{rl}] \begin{bmatrix} A_m \\ B_m \end{bmatrix} = [T_M] \begin{bmatrix} A_m \\ B_m \end{bmatrix}, \quad (11)$$

where $T_M$ is the telescoped Transmission Matrix due to all interactions. Within this formalism, any MGTI geometry can be calculated. Once the matrix elements have been determined for a given MGTI geometry, the phase delays as a function of wavelength can be calculated and then converted into time delays. The derivative of these time delays with respect to wavelength, as in Equation (3), is then the dispersion of the MGTI system.

Solving Equation (11) to determine the complex reflectivity of a multi-cavity system results in the following equation:

$$\rho_j = r_j + \frac{t_j^2 \rho_{j+1} e^{-1\varphi_j}}{1 + r_j \rho_{j+1} e^{-i\varphi_j}}, \quad (12)$$

where $\rho_J$ is the effective (complex) reflectivity of the cavity systems including and to the right of the plane containing the interface with reflectivity $r_J$, $t_j$ is the transmission through the plane containing the interface with reflectivity $r_J$, and $\phi_J$ is the propagation phase through the region between planes j and j+1, given as $$\varphi_j = \frac{2\pi n_{jk} G_j \cos\theta}{\lambda_k} \quad (12b)$$

where $n_{Jk}$ is the refractive index of length $G_j$ for wavelength $\lambda_k$, and $\theta$ is the external angle of incidence to the j=1 layer.

The counting system herein is from left to right, and+goes in front of reflectivities going left to right while−goes in front of reflectivities going right to left. These parameters are diagrammed in FIG. 15. Such an option could be useful when successive channels on a regular grid require unique dispersion functions, for example, or if the channel spacing itself varies.

Figure 16A:
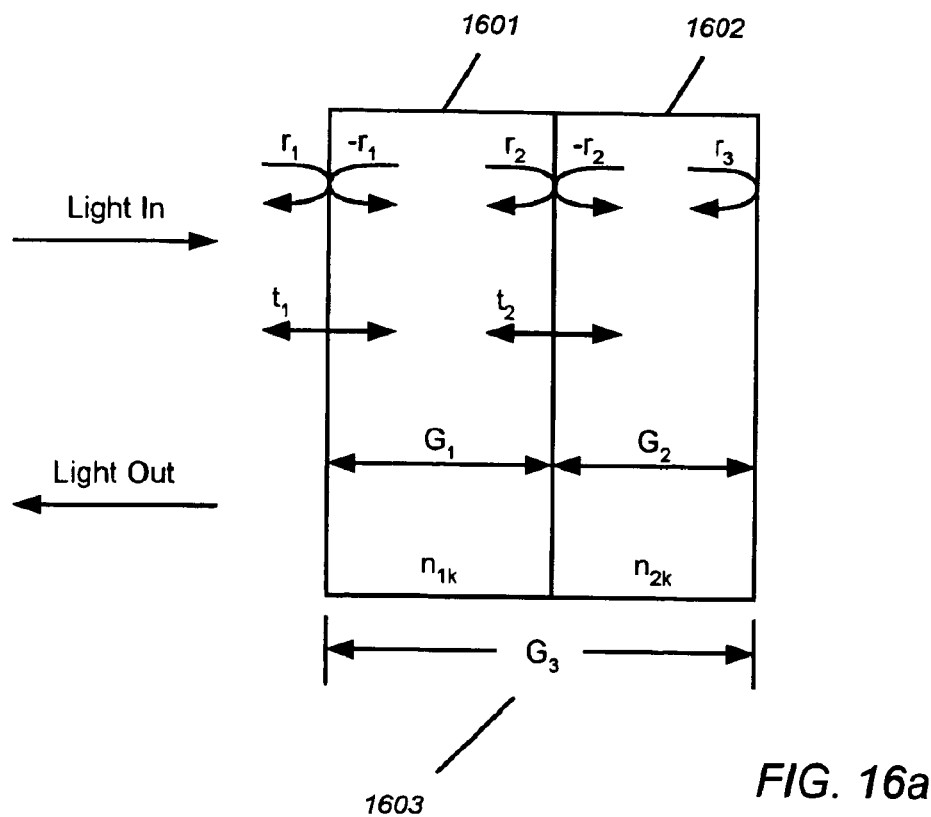
FIG. 16a is a diagram of the parameters in an explicit system three-cavity GTI according to an embodiment of the present invention.
Figure 16B:
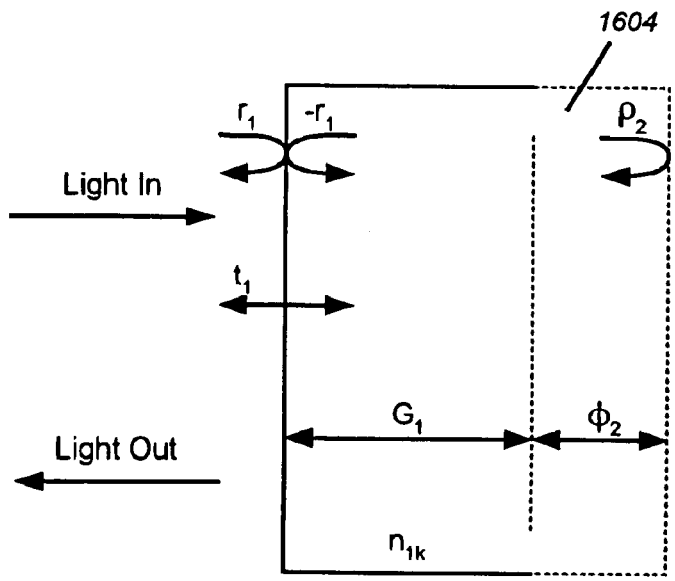
FIG. 16b is a diagram of the parameters in a first effective system of the three-cavity GTI of FIG. 16a according to an embodiment of the present invention.
Figure 16C:
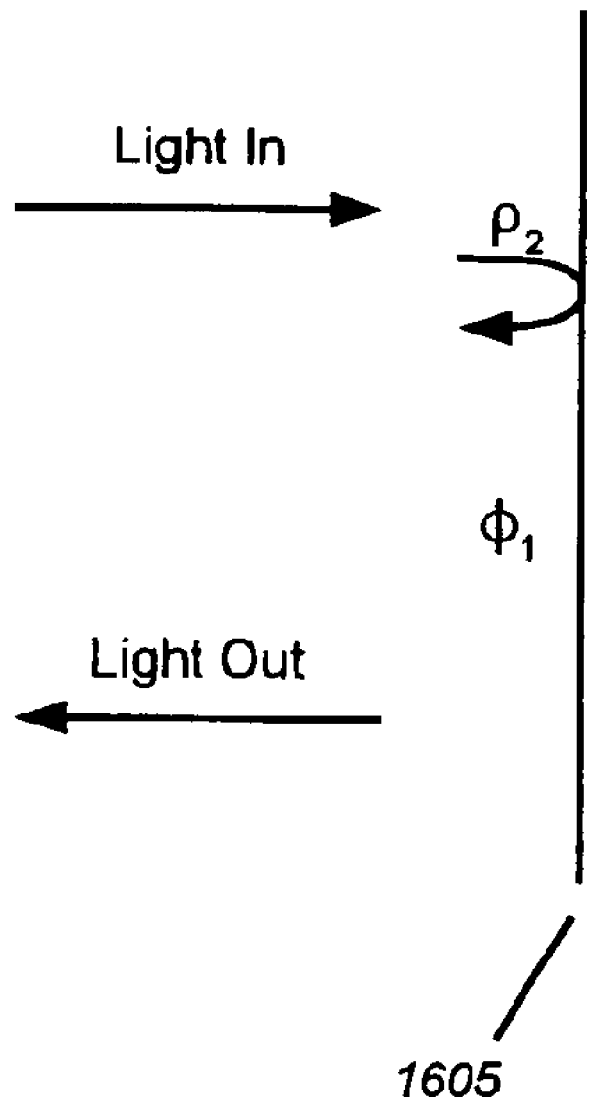
FIG. 16c is a diagram of the parameters in a second effective system of the three-cavity GTI of FIG. 16a according to an embodiment of the present invention.
Figure 17:
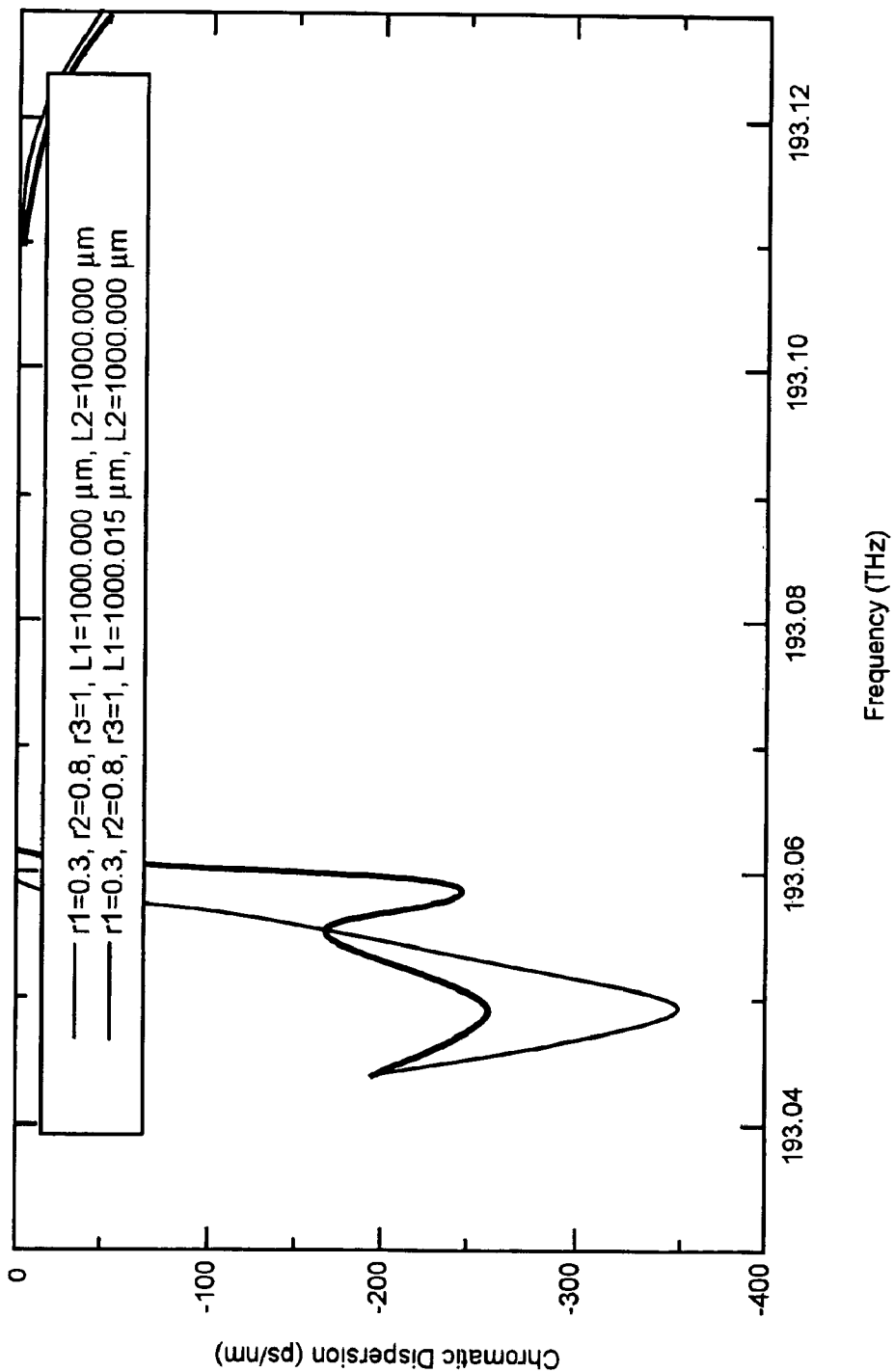
FIG. 17 is a plot of the performance of two versions of a multi-cavity GTI with various device paramaters according to an embodiment of the present invention.

As an example of an MGTI's performance, consider the case of a three-cavity MGTI. Such a system is diagrammed in FIG. 16. FIG. 16a diagrams the explicit system, wherein cavities one 1601 and two 1602 are the outer two cavities, and cavity three 1603 is formed by the whole system's length. Going from left to right in FIG. 16 encounters reflectivity $r_1$ with accompanying transmissivity $t_1$, propagation length $G_1$, reflectivity $r_2$ with accompanying transmissivity $t_2$, propagation length $G_2$, and reflectivity $r_3$ with accompanying transmissivity $t_3$. FIG. 16b then diagrams the first effective system, wherein the back cavity 1602 has been compressed into an effective cavity 1604. Generally speaking, a stack of multi-layers of dielectric materials can be viewed as a mirror. In this sense, even a cavity can be viewed as a complex "mirror" comprised of two dielectric mirrors plus a cavity in between them. Thus, cavity 2 (1602), including the mirrors with reflection coefficients r2 and r3, can be viewed as a mirror with a reflection coefficient of ρ2 with a phase shift of φ2. The new cavity formed by this "mirror" and the front mirror (with reflection coefficient r1) is the so-called effective cavity. In other words, the effective cavity is the resulting optical cavity made by combinations of coupled sub-cavities. By extending this concept further, the whole stack shown in FIG. 16a can be viewed as a mirror with a reflection coefficient of ρ1 with a phase shift of φ1. This is shown as effective system 2 in FIG. 16c, wherein all cavities have been compressed into a single effective complex reflectivity plane 1605. The light beam sees this effective complex reflectivity plane as a single reflective plane with some reflectivity r and some phase φ, even though no actual reflective plane exists there. FIG. 17 then diagrams a plot of the performance of two versions of an MGTI wherein various device parameters were varied to demonstrate how the device's performance could be tuned. As can be noted, the general performance alteration of the coupled MGTI is similar to that of the combined MGTI.

Although the present invention has been fully described in connection with the accompanying drawings, it is to be noted that various changes and modifications will become apparent to those skilled in the art. Such changes and modifications are to be understood as being included within the scope of the present invention as defined by the appended claims.

What is claimed is:

1. A dispersion compensation module (DCM), comprising:
    a spacer region having a first side and a second side opposite the first side for passing a beam of light;
    an input controller adjacent to the spacer region for receiving the beam of light and for orienting the beam of light to propagate through the spacer region at a propagation angle of at least P/2S, where P is a required beam pitch and S is a spacer region length;
    a plurality of reflective elements adjacent to the first and second sides of the spacer region for reflecting the beam of light; and
    an output controller adjacent to the spacer region for outputting the beam of light;
    wherein one or more of the plurality of reflective elements is an all-pass optical dispersion filter.

2. The DCM as recited in claim 1, wherein one or more of the all-pass optical dispersion filters comprise a Gires-Tournois Interferometer (GTI).

3. The DCM as recited in claim 2, wherein one or more of the GTIs is a multi-cavity GTI and wherein the length, front-mirror reflectivity and refractive index of each cavity in the multi-cavity GTI is selected to produce a desired combined working bandwidth.

4. The DCM as recited in claim 1, wherein the input coupler is adjacent to the first side of the spacer region and the output coupler is adjacent to the second side of the spacer region, and the input coupler and output coupler are arranged with respect to the plurality of reflective elements so that the beam of light makes an even number of interactions with the plurality of reflective elements before exiting the DCM through the output coupler.

5. The DCM as recited in claim 1, wherein the input coupler and output coupler are adjacent to the first side of the spacer region, and the input coupler and output coupler are arranged with respect to the plurality of reflective elements so that the beam of light makes an odd number of interactions with the plurality of reflective elements before exiting the DCM through the output coupler.

6. The DCM as recited in claim 1, wherein one of the plurality of reflective elements is a mirror, the input coupler is adjacent to the first side of the spacer region and the output coupler is adjacent to the second side of the spacer region, and the input coupler and output coupler are arranged with respect to the plurality of reflective elements so that the beam of light makes an even number of interactions with the plurality of reflective elements before exiting the DCM through the output coupler.

7. The DCM as recited in claim 1, wherein one of the plurality of reflective elements is a mirror, the input coupler and output coupler are adjacent to the first side of the spacer region, and the input coupler and output coupler are arranged with respect to the plurality of reflective elements so that the beam of light makes an odd number of interactions with the plurality of reflective elements before exiting the DCM through the output coupler.

8. The DCM as recited in claim 1, wherein $P=D+d+\sigma$, where D is a diameter of the beam of light, d is an added displacement, $\sigma$ is a relative beam shift between two adjacent shifted light beams into which the beam of light has separated, and S is the spacer region length.

9. The DCM as recited in claim 1, wherein the input coupler comprises a diffraction-limited beam coupler for directing the light beam into the spacer region with the propagation angle.

10. The DCM as recited in claim 9, wherein the diffraction-limited beam coupler includes an angle fixing element for directing the light beam into the spacer region with the propagation angle.

11. The DCM as recited in claim 1, wherein two of the all-pass optical dispersion filters are Gires-Tournois Interferometers (GTIs) used in tandem, each GTI having length and front mirror reflectivity values selected to produce a desired combined working bandwidth.

12. A method for generating adjustable bandwidth dispersion compensation, comprising:

receiving a beam of light;

orienting the beam of light to propagate through a spacer region at a propagation angle of at least P/2S, where P is a required beam pitch and S is a spacer region length;

reflecting the beam of light a plurality of times across the spacer region, wherein all-pass optical dispersion filtering is performed at one or more of the reflections; and outputting the beam of light.

13. The method as recited in claim 12, further comprising:

performing the all-pass optical dispersion filtering using a Gires-Tournois Interferometer (GTI).

14. The method as recited in claim 13, further comprising:

performing all-pass optical dispersion filtering at one or more of the reflections using a multi-cavity GTI; and selecting length, front-mirror reflectivity and refractive index values for each cavity in the multi-cavity GTI to produce a desired combined working bandwidth.

15. The method as recited in claim 12, further comprising:

receiving and outputting the beam of light on opposite sides of the spacer region; and positioning locations for receiving and outputting the beam of light with respect to locations of the plurality of reflections so that the beam of light makes an even number of reflections before being outputted.

16. The method as recited in claim 12, further comprising:

receiving and outputting the beam of light on one side of the spacer region; and positioning locations for receiving and outputting the beam of light with respect to locations of the plurality of reflections so that the beam of light makes an odd number of reflections before being outputted.

17. The method as recited in claim 12, further comprising:

receiving and outputting the beam of light on opposite sides of the spacer region;

reflecting the beam of light using a mirror at one or more of the reflections; and positioning locations for receiving and outputting the beam of light with respect to locations of the plurality of reflections so that the beam of light makes an even number of reflections before being outputted.

18. The method as recited in claim 12, further comprising:

receiving and outputting the beam of light on one side of the spacer region;

reflecting the beam of light using a mirror at one or more of the reflections; and positioning locations for receiving and outputting the beam of light with respect to locations of the plurality of reflections so that the beam of light makes an odd number of reflections before being output.

19. The method as recited in claim 12, wherein $P=D+d+\sigma$, where D is a diameter of the beam of light, d is an added displacement, $\sigma$ is a relative beam shift between two adjacent shifted light beams into which the beam of light has separated, and S is the spacer region length.

20. The method as recited in claim 12, further comprising:

directing the light beam into the spacer region with the propagation angle using a diffraction-limited beam coupler.

21. The method as recited in claim 20, further comprising:

using an angle fixing element for directing the light beam into the spacer region with the propagation angle.

22. The method as recited in claim 12, further comprising:

performing all-pass optical dispersion filtering at two of the reflections using Gires-Tournois Interferometers (GTIs) in tandem; and selecting length and front mirror reflectivity values for each GTI to produce a desired combined working bandwidth.

23. A method for shaping a chromatic dispersion of a beam of light, comprising:

receiving a beam of light;

orienting the beam of light to enter a spacer region at an angle of at least P/2S from normal incidence, where P is a required beam pitch and S is a spacer region length;

reflecting the beam of light a plurality of times across the spacer region, whereby a change in a chromatic dispersion of the beam of light is induced; and outputting the beam of light.

24. The method as recited in claim 23, wherein the change is induced using a Gires-Tournois Interferometer (GTI).

25. A method for shaping a chromatic dispersion of a beam of light, comprising:

receiving a beam of light;

orienting the beam of light to enter a reflective element at an angle of at least P/2S from normal incidence, where P is a required beam pitch and S is a spacer region length;

reflecting the beam of light a plurality of times across a spacer region, whereby a change in a chromatic dispersion of the beam of light is induced; and outputting the beam of light.

26. The method as recited in claim 25, wherein the reflective element is a Gires-Tournois Interferometer (GTI).

* * * * *